United States Patent [19]
Shaked et al.

[11] Patent Number: 5,991,512
[45] Date of Patent: Nov. 23, 1999

[54] INK RELOCATION FOR COLOR HALFTONES

[75] Inventors: Doron Shaked, Haifa; Nur Arad, Tel-Aviv, both of Israel; Andrew Fitzhugh, Mountain View; Irwin Sobel, Menlo Park, both of Calif.

[73] Assignee: Hewlett-Packard Company, Palo Alto, Calif.

[21] Appl. No.: 08/904,026

[22] Filed: Jul. 31, 1997

[51] Int. Cl.[6] .................................................. H04N 1/46
[52] U.S. Cl. .................... 395/109; 358/456; 358/534; 358/518; 382/275
[58] Field of Search ........................... 395/101, 109; 358/455, 456, 457, 534, 535, 536, 518, 463; 382/275, 254, 266, 274

[56] References Cited

U.S. PATENT DOCUMENTS 5,768,440 6/1998 Campanelli et al. .................. 382/275

Primary Examiner—Thomas D. Lee

[57] ABSTRACT

Current methodologies for color image halftoning produce prominent halftoning noise. Brightness variations between color dots placed at neighboring locations are a primary cause of color halftone noise. To correct this flaw, an Ink Relocation Postprocess to halftoning algorithms relocates ink drops between neighboring drop locations in order to reduce local brightness variations. Due to the intrinsic blurring side-effect of ink relocation, some enhancement may be desired. Two application-specific enhancement procedures are presented. In the first enhancement, ink relocation is suppressed in areas of fine detail. In the second enhancement, edge sharpening is performed after ink relocation.

32 Claims, 13 Drawing Sheets

INK RELOCATION FOR COLOR HALFTONES

BACKGROUND OF THE INVENTION

1. Field of the Invention

The present invention relates to digital image processing and, more particularly, to processing color halftone images.

2. Description of the Related Art

Monochrome halftone algorithms are carefully designed to reduce visible artifacts. Current color halftoning algorithms are usually a Cartesian product of three halftoned monochrome planes corresponding to the color components of the image. See, for example, A. Zakhor, S. Lin and F. Eskafi, "A New Class of B/W and Color Halftoning Algorithms", *International Conference on Acoustics, Speech and Signal Processing,* 1991.

To produce a good color halftone one has to place colored dots so that the following specifications are optimally met:

(1) The placement pattern is visually unnoticeable.

(2) The local average color is the desired color.

(3) The colors used reduce the notice-ability of the pattern.

The first two design criteria are easily carried over from monochrome algorithms. However, the third cannot be satisfied by a simple Cartesian product generalization of monochrome halftoning.

One of the most dominant factors in producing halftone noise artifacts is the variation in the brightness of the dots. In monochrome halftones (i.e., Black and White), this factor cannot be mitigated. In color halftoning there are however colors that could be rendered using different halftone-color sets (with different brightness variation). To be able to use those specific halftone-colors in the actual rendering the color planes would have to be correlated. Hence a simple Cartesian product generalization of monochrome halftoning will not address this problem.

In U.S. patent aplication Ser. No. 08/641,304, filed Apr. 30, 1996, entitled "Joint Design of Dither Matrices for a Set of Colorants" and assigned to the same entity as this application, Jan Allebach and Qian Lin describe a criterion to use colors selected to reduce the notice-ability of the pattern. In their implementation, they disable the use of certain halftone-colors when rendering some colors. However, their interpretation of the third criterion is only partial and hence their application achieves only part of the possible halftone noise reduction.

Thus, it can be seen that color halftone imaging techniques impose pattern notice-ability limits upon halftone image output devices, and hinder the use of these devices in many applications.

Therefore, there is an unresolved need for a technique that can create better color halftone images by correctly incorporating the third design criterion (i.e., by using colors that reduce the notice-ability of the pattern).

SUMMARY OF THE INVENTION

A process and apparatus is described to reduce the notice-ability of the artifact pattern of halftoned color images by a process of ink relocation. The Ink Relocation process transforms arbitrary color halftones to halftones conforming to the third color design criterion which is embodied in the Minimum Brightness Variation Criterion (MBVC).

Ink Relocation reduces halftone noise, however, it may also blur details in the image. After a short discussion of some relevant color correction issues, we present two alternative enhancement techniques to overcome the blur. The first is essentially a switch, disabling Ink Relocation near significant image details (edges). The second is a modification of a halftone sharpening process.

The Ink Relocation procedure can be applied to any arbitrary color halftoned image, and can substantially improve the image quality. The procedure is also reasonably fast to compute.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–13. Those skilled in the art will readily appreciate that the detailed description given herein with respect to these figures is for explanatory purposes, however, because the invention extends beyond these limited embodiments.

Figure 1:
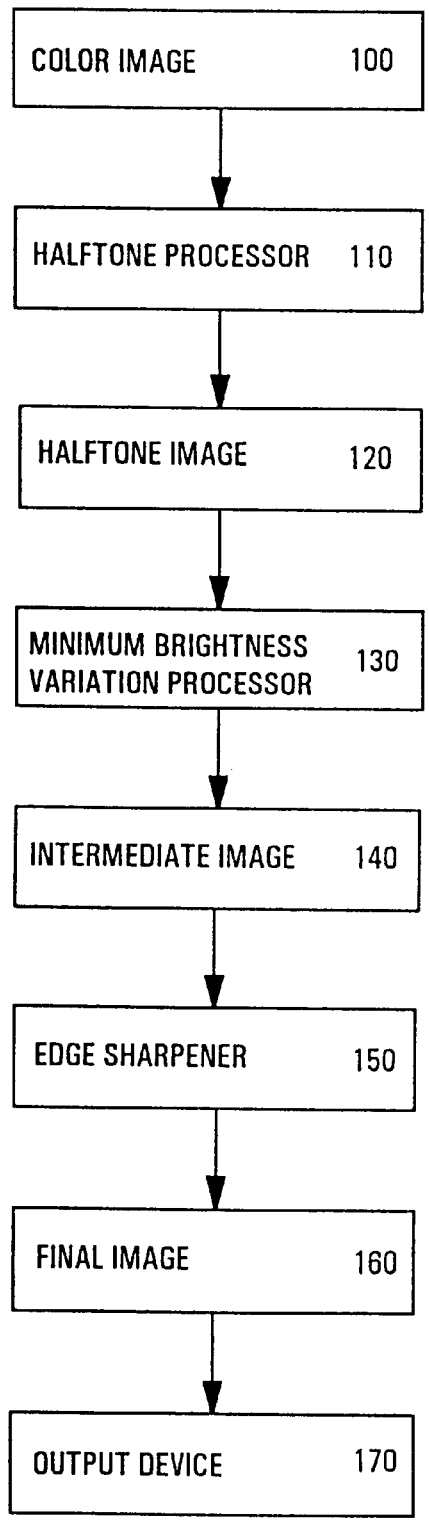
FIG. 1 is a block diagram illustrating an apparatus for processing and displaying a color halftoned digital image using a post-processing color halftone local brightness variation reduction scheme according to the present invention.

FIG. 1 is a block diagram illustrating an apparatus for processing and displaying a color halftoned digital image using a post-processing color halftone local brightness variation reduction scheme according to the present invention. In FIG. 1, digital color image 100 is processed by halftoning processor 110 to yield color halftone image 120. Halftone processor 110 may operate using any known color halftoning technique. Hence, color halftone image 120 can be any arbitrary color halftone image. As will be described below in greater detail, minimum brightness variation processor 130 operates on halftone image 120 to form intermediate image 140.

For one embodiment, edge-sharpening processor 150 operates on intermediate image 140 to yield sharpened final image 160, which is then produced by output device 170. Alternately, edge-sharpening is not performed. Instead, the intermediate image 140 is the final image 160 produced by output device 170.

Figure 2:
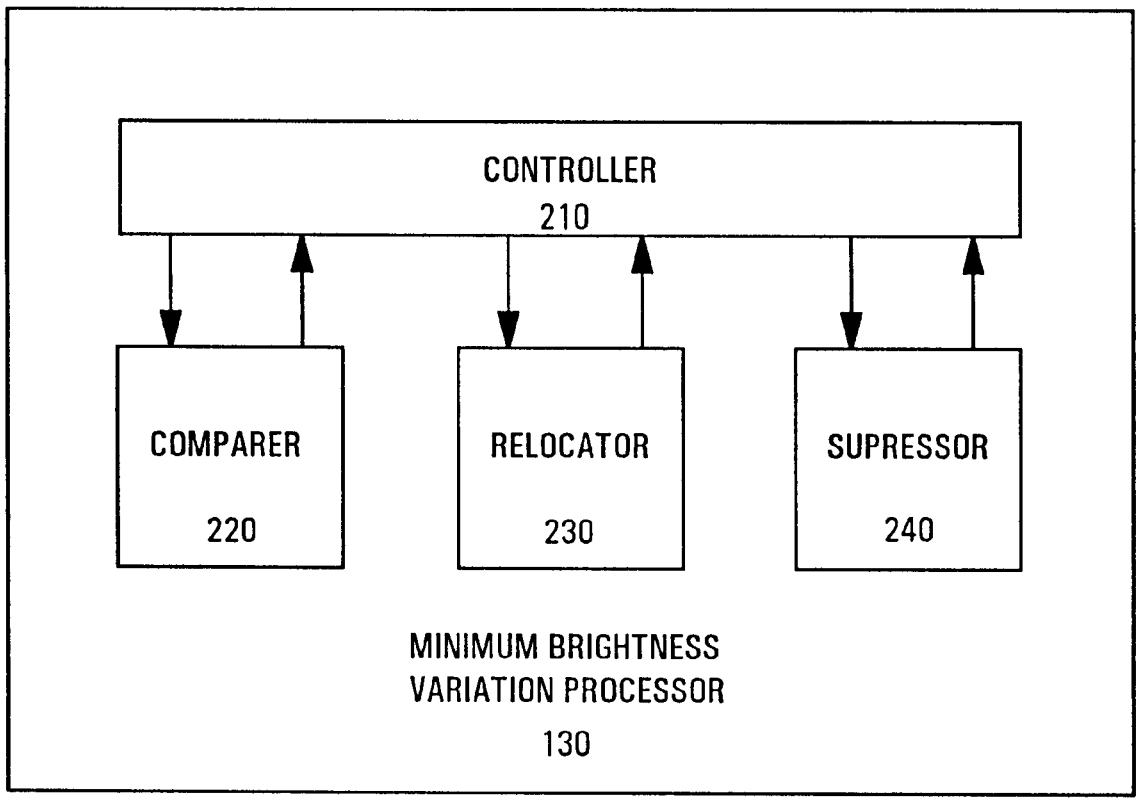
FIG. 2 is a block diagram illustrating a post-halftoning apparatus suitable for applying color halftone local brightness variation reduction according to the present invention.

FIG. 2 is a block diagram illustrating a post-halftoning apparatus suitable for applying color halftone local brightness variation reduction according to the present invention. Minimum brightness variation processor 130 includes controller 210, comparer 220, relocator 230 and suppressor 240.

Controller 210 controls operation of the minimum brightness variation processor such that the brightness variation of adjacent pixels in the color halftone image are examined. If comparer 220 identifies a candidate pixel set wherein brightness variation can be reduced, then relocator 230 will replace the pixel values of the candidate set with pixel values having a lesser brightness variation.

For one embodiment, suppressor 240 will quash brightness variation reduction by relocator 230 under certain circumstances that will be explained below. Alternately, suppressor 240 is not used, and relocator 230 will operate to minimize brightness variation for any candidate pair identified by comparer 220.

Figure 3:
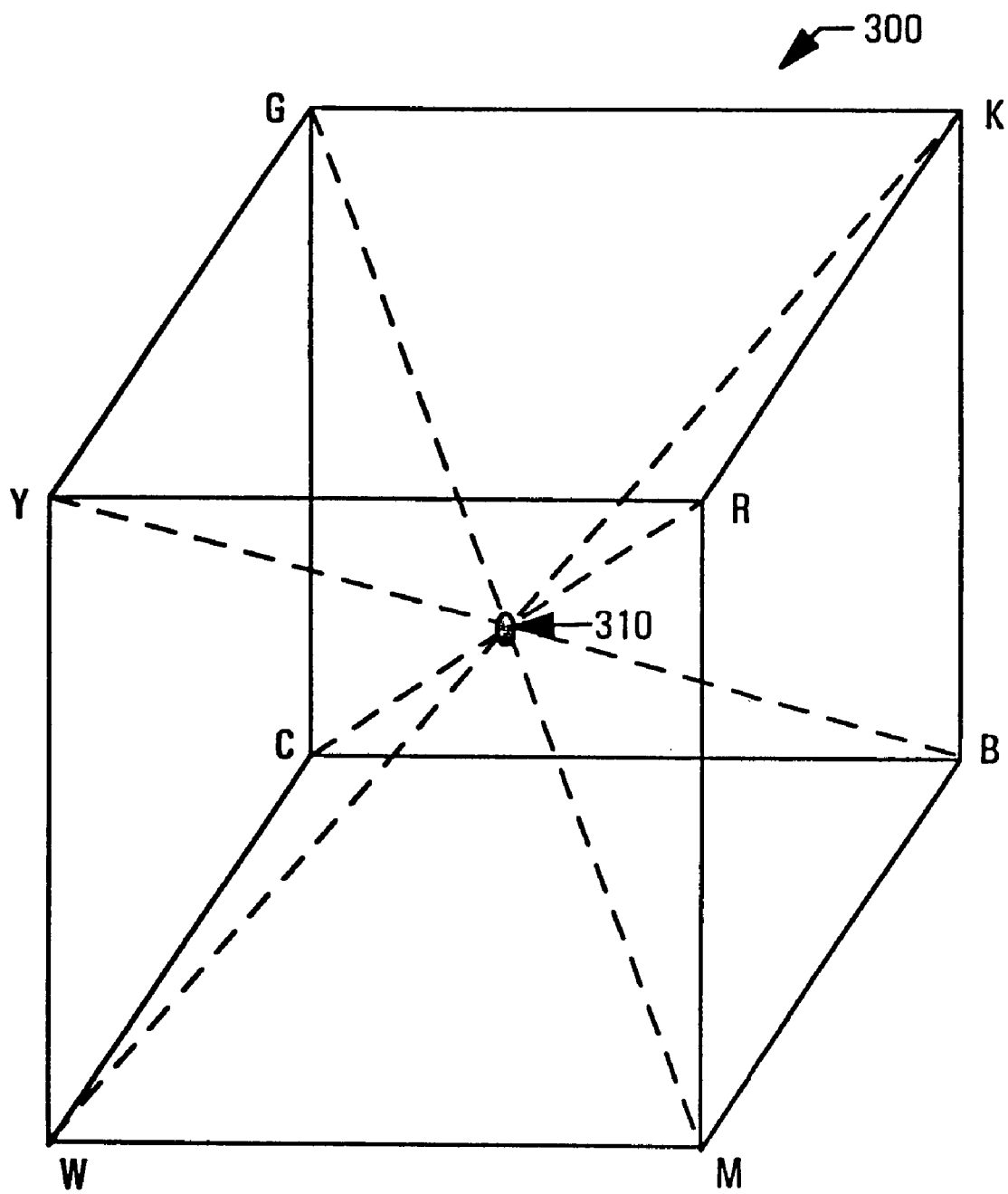
FIG. 3 is a drawing illustrating the RGB cube, with main diagonals meeting on 50% gray.
Figure 4A:
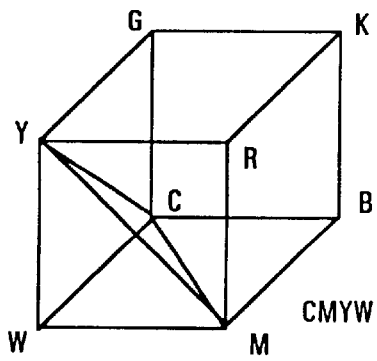
FIGS. 4 A through F are drawings illustrating the partition of the RGB cube into six classes, each of which is the convex hull of the minimal brightness variation quadruple for optimal rendition of colors in that class.
Figure 4B:
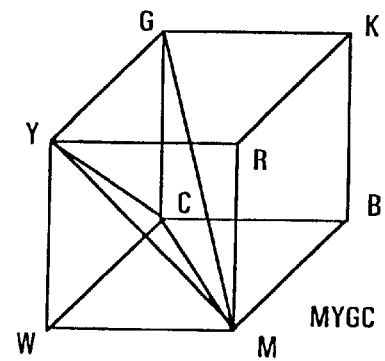
Figure 4C:
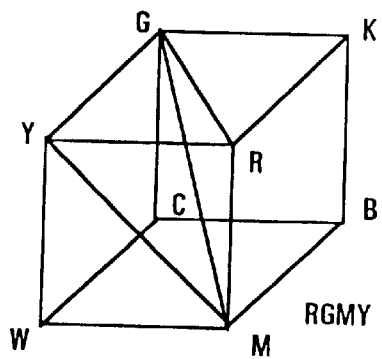
Figure 4D:
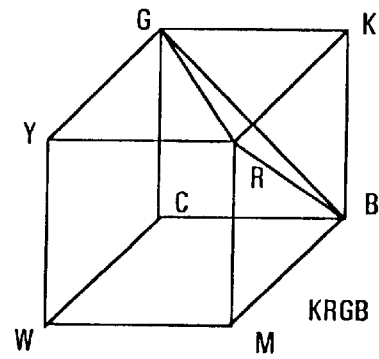
Figure 4E:
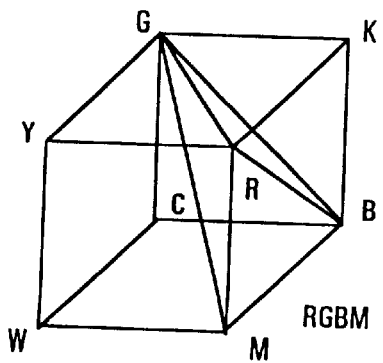
Figure 4F:
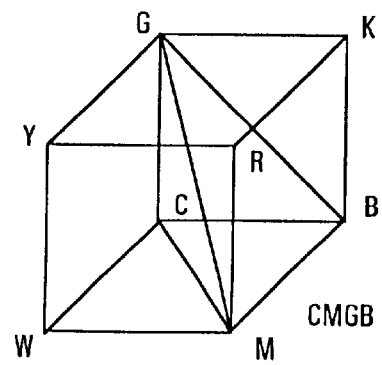

The underlying principle of operation of minimum brightness variation processor 130 is best explained by example. Take for example, a solid patch of 50% Gray. Suppose some dot pattern (e.g., checkerboard) is selected. This pattern could be equally rendered with Black and White dots as with Blue and Yellow, Red and Cyan, or Green and Magenta dots. FIG. 3 is a drawing illustrating the RGB cube and its main diagonals, meeting on 50% gray 310. As can be seen in FIG. 3, the color of the halftoned patch will, theoretically, be the same in all cases. The noise effect, however, will be different. Green and Magenta being almost equally bright will have a low noise effect, in contrast to, for example, Black and White.

The example demonstrates the benefits of adding the proposed minimum brightness variation color criterion to the design rules of color halftoning methods. In Section 1 we analyze this additional criterion by examining a simple case of rendering patches of arbitrary solid color. The redesign of the various halftone methods with an additional color criterion deserves special treatment, and is described in co-pending patent application U.S. application Ser. No. 08/903,899,entitled "Color Halftone Error Diffusion with Local Brightness Variation Reduction", filed on even date herewith. Section 2 presents Ink Relocation, a postprocess which transforms arbitrary halftones to halftones conforming to the new color design criterion. In Section 3 after a short discussion of some relevant color correction issues, we present two alternative enhancement routines to overcome the blur. The first is essentially a switch, disabling Ink Relocation near significant image details (edges). The second is a modification of a halftone sharpening process described in greater detail in U.S. patent application Ser. No. 08/734,821,, filed Oct. 22, 1996, A. Silverstein. Section 4, describes in detail one embodiment of Ink Relocation. Section 5 is a summary.

1. Solid Color Patches

In this section we analyze the color design criterion in a special case of rendering a large patch of an arbitrary solid color. It is known that given a color in the RGB cube, it may be rendered using the 8 basic colors located at the vertices of the cube. Actually, any color may be rendered using no more than 4 colors, different colors requiring different quadruples. Moreover, the quadruple corresponding to a specific color is, in general, not unique (in a linear color space, any quadruple whose convex hull contains the desired color will do). The issue we raise in this section is: Suppose we want to print a patch of solid color, what colors should we use? Note that in all previous work done on halftoning the issue was what pattern should the dots be placed in, and less often how many dots of each color should be used.

Consider the basic rationale of halftoning: When presented with high frequency patterns, the human visual system "applies" a low-pass filter and perceives only their average. Current inkjet printing resolution (up to approximately 600 dpi) can still be resolved by the human visual system, thus still higher frequencies may have to be achieved. Relevant to the problem at hand is the fact that the human visual system is more sensitive to changes in brightness than to the changes in chrominance, which average at much lower frequencies. Thus we arrive at the Minimal Brightness Variation Criterion for halftoning of solid color patches:

The Minimal Brightness Variation Criterion

To reduce halftone noise, select from within all color sets by which the desired color may be rendered, the one whose brightness variation is minimal.

There are several standard "visually uniform" color spaces, and standard color difference measures. See, for example, G. Wyszecki and W. S. Stiles, *Color Science: Concepts and Methods, Quantitative Data and Formulae*, Second edition, John Wiley and Sons, 1982. The proposed minimal brightness variation criterion is not necessarily equivalent to choosing the set whose maximal difference measure is minimal. The rationale behind our preference of an apparent one-dimensional projection (on the luminance axis) of a more general measure is that the visually uniform color spaces and the resulting color difference measures were developed for large solid color patches. We, on the other hand, consider colors in a high frequency pattern. Chrominance differences between participating colors plays a part, however, due to the stronger low-pass in the chrominance channel, they matter much less than is embodied in the standard color difference formulas. We maintain that at the resolution of a typical CMYK printer the minimal brightness variation criterion is a reasonable one.

To consider the brightness variation of color sets we need only to order the eight basic colors on a brightness scale. In color theory (see, for example, L. D. Grandis, *Theory and Use of Color*, translated by J. Gilbert, Prentice Hall, Inc. and Harry N. Abrams, Inc., 1984), the primary colors (Cyan, Magenta and Yellow), and secondary colors (Red, Green and Blue) have a specific brightness order: Blue is the darkest secondary color and Green is the brightest. Their complementary colors Yellow (complements Blue) is the brightest primary and Magenta (complements Green) is the darkest. Hence, we have two color orders: The "dark" colors ordered {KBRG}, and the "bright" ones ordered {MCYW}. The question then becomes, what is the combined brightness order.

It would be only natural to assume that the bright colors are always brighter than the dark ones. Indeed, using most inks this is the case. However, if other inks (or other media for that matter) are used, this may change. For example, colors rendered on some CRT screens have a different brightness ordering: {KBRMGCYW}, in which Magenta is darker than Green. It is easily seen that this permutation is actually the only one possible in current three-color systems. Current technology produces Red as a two ink-drop overlay of Magenta and Yellow. Similarly Blue is an overlay of Magenta and Cyan. Thus Magenta cannot be darker than Red or Blue. Green cannot be brighter than Cyan or Yellow, because it is produced as an overlay of Cyan and Yellow. This argument is valid in a subtractive three-color system (e.g., printing). A similar argument may be formulated for additive color systems (e.g., CRTs).

An interesting expected by-product of the use of the minimal brightness variation criterion is that color patches are rendered as more saturated. This phenomenon is highly dependent on the media (e.g., paper type) and the incorporated color correction, elaborated on in Section 3. Improved color saturation is expected because when applying the minimal brightness variation criterion, neutral dots (K or W) are discarded, and saturated dots (R, G, B, C, M, or Y) are used instead. Thus rendered patches appear far from the neutral (Gray) axis (the K-W axis in FIG. 3).

It is interesting to note that similar claims about the colorfulness of "dull" tones have been made by the Neo-Impressionists more than a century ago. Georges Seurat (1859–1891) an artist and art theoretician, developed his theories on pointillism (as an artistic method) in the dawn of color printing. Amongst others, he maintained that in order to render the effects of natural light and shadow, one has to apply dot combinations of complementary colors, rather than combinations of Black and White. In fact, he and his followers banned Black from their pallet altogether.

2. The Ink Relocation Postprocess

In the previous section we determined that the color design criterion for the special case of constant color patches is the minimal brightness variation criterion. However, natural images are much more complex than patches of solid color, and halftoning algorithms are carefully designed to optimally render a variety of textures and patterns. Each halftoning algorithm, e.g., Dithering, or Error-Diffusion, uses different techniques, which interpret the same design criteria differently. As mentioned previously, incorporation of the additional color criterion to each of the basic halftone methods requires a separate approach. Herein, we propose the Ink Relocation postprocess to arbitrary halftones, to produce less noisy halftones based on the minimal brightness variation criterion.

Let us consider once more the simple example of large patches of solid color. How do existing algorithms select the color dots to be used? In Error Diffusion practically all 8 basic colors are used in rendering any solid color patch, their appearance ratio being some decreasing function of their distance from the desired color. In dithering, however, if the same dither screen angle is used for all color planes, only 4 colors: White, a primary, a secondary, and Black are used, in the following manner: Locations for which the dither value is higher than the R, G, and B values of the desired color are allocated a Black dot. Locations for which the dither value is less than the highest RGB value, but larger than the rest are allocated a secondary (the highest among R, G, and B). Locations for which the dither value is higher only from the smallest value of the RGB components are allocated a primary (the combination excluding the lowest among R, G, and B, which will be either C, M, or Y). All remaining locations (dither value less than all RGB values) are allocated White. Formally, define:

$$V_{max}=\max\{R,G,B\},\ V_{med}=\mathrm{med}\{R,G,B\},\ V_{min}=\min\{R,G,B\}, \quad (1)$$

The secondary color used is $\mathrm{argmax}\{R,G,B\}$, and the primary color is the additive combination of the two distinct secondaries $\mathrm{argmax}\{R,G,B\}$ and $\mathrm{argmed}\{R,G,B\}$. The color appearance rates in the dither quadruple are:

$$W=V_{min}\ \mathrm{Primary}=V_{med}-V_{min}$$

$$K=1-V_{max}\ \mathrm{Secondary}=V_{max}-V_{med}. \quad (2)$$

Note that the rates sum up to 1. Note also that in terms of the minimal brightness variation criterion, the dither quadruple is the worst possible choice, because Black and White are always present.

Now that we have a way to determine a valid quadruple and the corresponding appearance ratios, we can use it to determine the minimal brightness variation quadruple and its appearance ratios. We do so algorithmically: First take an equal amount of Black and White dots, replace them by Green and Magenta dots respectively, until there are no more Black or White dots. (To maintain consistency with the original halftone pattern, dark dots (Green) replace dark dots (Black), and bright dots (Magenta) replace bright dots (White). Denote this transform by $$KW \rightarrow GM. \quad (3)$$

Proceed with the following similar procedures (which are trivially void if procedure (3) eliminates all Black dots):

$$KY \rightarrow RG;\ KC \rightarrow BG;\ KM \rightarrow BR. \quad (4)$$

Now if a Black dot still remains, the minimal brightness variation quadruple is RGBK. Otherwise proceed with the following procedures:

$$WB \rightarrow CM;\ WR \rightarrow YM;\ WG \rightarrow YC. \quad (5)$$

Now if a White dot remains, the minimal brightness variation quadruple is WCMY. Otherwise we are left with dots of 6 colors. To eliminate the two last colors, the following two procedures select between Blue and Yellow, and between Red and Cyan:

$$BY \rightarrow GM;\ RC \rightarrow GM. \quad (6)$$

This seemingly complex algorithmic description may be easily interpreted as a partition of the RGB cube into the six tetrahedra shown in FIGS. 4 A through F. Thus, FIGS. 4 A through F are drawings illustrating the partition of the RGB cube into six classes, each of which is the convex hull of the minimal brightness variation quadruple.

The minimal brightness variation quadruple corresponding to a given color is the set of vertices of the tetrahedra in which it is located. Thus, given an RGB triplet, one may compute its minimal brightness variation quadruple by point location. Such a computation entails (on the average) 4 additions and under 3 comparisons.

The partition in FIGS. 4 A through F, together with the brightness scale show that all colors can be rendered using their specified quadruple, and that the specified quadruple is indeed the minimal brightness variation quadruple.

Figure 5:
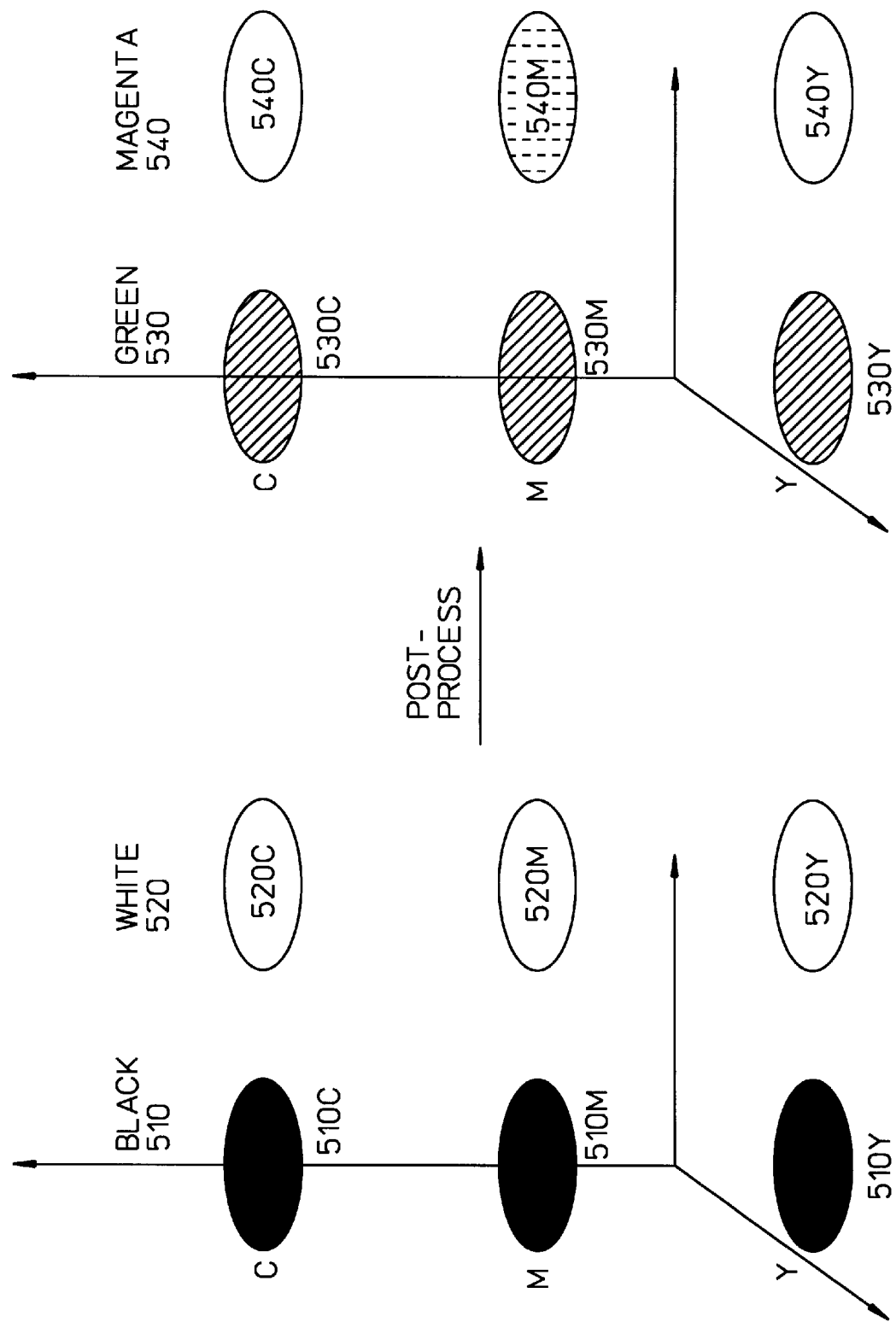
FIG. 5 is a drawing illustrating local brightness variation reduction through relocation of an ink dot as practiced according to one embodiment of the present invention.

Because any halftoning method renders desired colors locally, the process described in (3)–(6) may also be applied locally. Note also that all the processes involve actually no more than a relocation of a single ink layer between two locations. A dot is relocated from a multi-dot location to a location with less dots. Actually in all processes (3)–(5), dot number differences are two or three. For example, FIG. 5 is a drawing illustrating local brightness variation reduction through relocation of ink dots as practiced according to one embodiment of the present invention. The process in (3) involves a relocation of the Magenta ink drop from the location of the Black dot (a 3-dot location), to the empty location of the White dot (3 dot difference), as can be seen in FIG. 5.

In FIG. 5, Black dot 510 and White dot 520 are replaced after the post-process by Green dot 530 and Magenta dot 540, respectively. Black dot 510 is composed of Cyan dot 510C, Magenta dot 510M and Yellow dot 510Y, whereas Green dot 530 is produced by Cyan dot 530C and Yellow dot 530Y, with no Magenta dot at location 530M. Similarly, White dot 520 is composed of no dots (i.e., no Cyan dot at location 520C, no Magenta dot at location 520M and no Yellow dot at location 520Y), whereas Magenta dot 540 is produced by Magenta dot 520M, with no Cyan dot at location 520C or Yellow dot at location 520Y.

Thus, it can be seen that the Ink Relocation process can be viewed as a way of spreading ink dots from multi-dot locations to neighboring locations having fewer dots. However, this alternate view of the process is less satisfying than that of minimizing local brightness variation. This is because, modern printers typically generate Black dots using a separate single Black ink dot (instead of combining Cyan, Yellow and Magenta drops).

Figure 6:
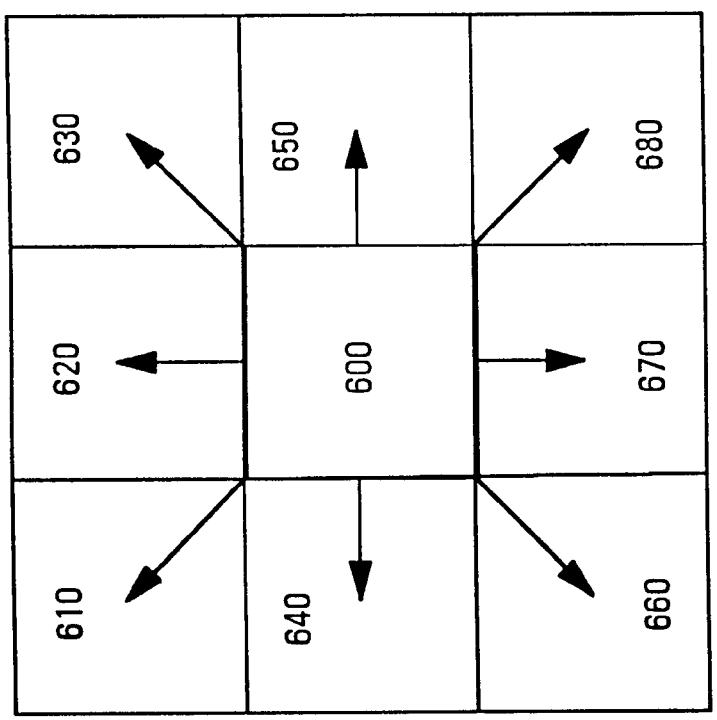
FIG. 6 is a drawing illustrating a neighborhood for ink relocation as practiced according to one embodiment of the present invention.

FIG. 6 is a drawing illustrating a neighborhood for ink relocation as practiced according to one embodiment of the present invention. For one embodiment in the Ink Relocation postprocess, each dot is compared sequentially to 4 of its immediate neighbors. Ink layers are relocated according to the processes (3)–(6). Thus, a dot at location 600 would be compared to the dot at location 650, then to the dots at locations 660, 670 and finally 680. Alternately, the more general 8-neighborhood of each pixel may yield better results, but will also require a delay of an additional raster line. Its use should be considered subject to application constraints. For this alternate embodiment, a dot at location 600 would be compared to each of the dots at locations 610, 620, 630, 640, 650, 660, 670 and finally 680. Other alternate embodiments are possible. We have found that examining four neighboring locations as specified above is faster and still produces fairly good results.

We have studied the results of Ink Relocation applied to halftones of a solid patch of color. In our tests, the postprocess applied to the dither halftone usually produced only the minimal brightness variation quadruple colors. The postprocess applied to the Error Diffusion halftone also produced a few other dots, however the brightness variability has been greatly reduced.

We studied patches of solid color rendered using Error-Diffusion and patches rendered using Error-Diffusion with Ink Relocation postprocess. The reduction in halftone noise, and halftone artifacts (worms) was found to be clearly visible (though dependent on the printer and media).

We also compared samples of an image, rendered using Bayer dither, Bayer Dither with Ink Relocation postprocess, Error-Diffusion, and Error-Diffusion with Ink Relocation postprocess. In those samples, the halftone noise and artifact reduction was found to be appreciated more easily than in solid patches.

Alongside the improvement of halftone quality due to Ink Relocation, some artifacts were visible, for which it should be noted that:

Postprocessing of dither halftones may produce some disturbing artifacts. These occur probably because of the interplay of the blue-noise dither with the structured postprocess: The neighbors are visited in the same order, and the nine relocations (3)–(6) are executed in the same order for each location. This can be easily overcome by varying the order in which the neighbors are visited, or varying the order in which the nine relocations (3)–(6) are executed, or both.

Any rendering method typically requires a color correction process. The use of Ink Relocation as a postprocess constitutes a change in the rendering method, and therefore may, sometimes, require a different color correction preprocess. Color correction is discussed in the next section.

Ink relocation is essentially a smoothing process. A relocated ink dot moves typically a single location, however it may move two locations. We have found that blurring effects are usually even less disturbing than expected because of the edge enhancement implicit in halftone noise reduction. Image sharpening and edge preservation issues are also discussed in the next section.

3. Additional Corrections and Enhancements

In this section we describe procedures incorporated into the pipeline in order to further improve the result of the Ink Relocation postprocess. We refer to brightness correction, color correction, edge enhancement, and image sharpening.

Brightness Correction

Ink dots are light filters. The spatial ink spreading of Ink Relocation reduces the total reflected light. For the relocation process (3)–(5) this phenomenon can be modeled as follows: Consider a wavelength of visible light. Denote the fraction of light reflected from the lighter location in that wavelength as l. Denote the fraction of light reflected from the two dots after relocation as $l_1$, and $l_2$. Because both relocated dots are darker than the original lighter location, we have:

$$l_1 < l \text{ and } l_2 < l \quad (7)$$

Assuming a linear model, the filter absorption at the original darker location is a superposition of the filters of the relocated dots. Hence the fraction of light reflected from that location is $l_1 l_2$. From Equation (7) it is easily shown that the fraction of light reflected from the two locations before relocation, is larger than after relocation:

$$l + l_1 l_2 > l_1 + l_2. \quad (8)$$

As for the two relocations of (6), theory does not predict a definite brightness change, but experimental results have shown that relocation does not appear to produce brighter patches.

The theory detailed above predicts that halftones processed by Ink Relocation will have a darker appearance than the original halftones. Indeed we have found that for many halftoning methods this is true. It has to be noted that in some halftoning methods the darkening effect was more dominant than in others. The brightness differences should be corrected for, preferably before the original halftoning.

Brightness differences are easily corrected by a mapping known as Gamma Correction. In Gamma Correction every intensity value x is mapped to a new value $x^{1/\gamma}$. Larger $\gamma$ values brighten the image. Because Gamma Correction is a pointwise process and relocation is a neighborhood-wise process, a statistical average (e.g., over patches of constant color) can be employed. One such approach will be explained in greater detail in the calibration method set forth below.

Color Correction

Ink Relocation processes may reduce the brightness non-uniformly. At the extreme end, there are colors in which an original rendering method does not require relocations at all.

All those, and the pure chromatic differences of rendering methods, are addressed by Color Correction. The Brightness correction is therefore only a first-order approximation to the more accurate color correction. One way that color correction was achieved is by producing 216 patches of constant color, evenly sampling the RGB cube. The Lab values of each sample were then measured by a color spectrometer. A mapping was constructed so that RGB values are mapped to new values which are rendered as expected from the original RGB value, thus compensating for all the color artifacts. This mapping applied as a preprocess resolves the color correction problem.

Edge Preservation

Ink Relocation is not a linear process, nevertheless its radius of influence can be estimated: The relocation caused by a single location influences usually only a single neighboring location. However, sometimes it may cause a series of relocations which may extend over two locations. One may therefore model the blur caused by Ink Relocation at sharp edges as having a radius of 2 dot locations.

The effect of the blur can be noted only at strong edges, where tone differences at both sides of the edge cause ink relocation over the edge. Therefore, blur can be prevented if edges are detected, and Ink relocation over the edges is suppressed. It is important to note that disabling the postprocess over edges does not reduce the positive effect of Ink Relocation, which was designed to improve the rendering of smooth areas in the first place.

Edges are locations in which the gradient magnitude is large. The gradient of a color image can be taken as either the gradient of the luminance component, or a combination of the gradients in the color planes. Alternately, for simplicity, we have produced good results by examining the change of the Green value of the RGB triplet. To maintain the necessary locality, we can use the simplest difference scheme for the gradient: For two neighboring pixels, Ink Relocation between them is suppressed, if the absolute difference in their G value is larger than a predetermined threshold. The threshold is checked for each pixel pair considered for Ink Relocation.

Edge Sharpening Post-Process

Most sharpening algorithms operate in the image domain. Some halftoning methods incorporate intrinsic sharpening. Because Ink Relocation processes halftones, for one embodiment we employ a sharpening algorithm operating in the halftone domain (image pixels do not always translate easily to halftone dot locations). A. Silverstein's halftone sharpening algorithm described in greater detail in U.S. patent application Ser. No. 08/734,821, filed Oct. 22, 1996, and incorporated herein by reference, requires some image data, but operates as a postprocess to halftones.
The basic halftone sharpening algorithm can be summarized as follows:

1) For each color plane and corresponding ink dots do 2–5.
2) For each dot location check the gray-level difference between the pixel corresponding to it and the pixel corresponding to the next location on the left.
3) If the gray-level difference (gradient) is large (larger than a predetermined threshold), make sure the halftone gradient does not disagree.
4) If the halftone gradient disagrees (a dot on the lighter image location, and no dot on the darker image location), switch the dot location.
5) Do the same, comparing each location with the location below it.

Figure 13:
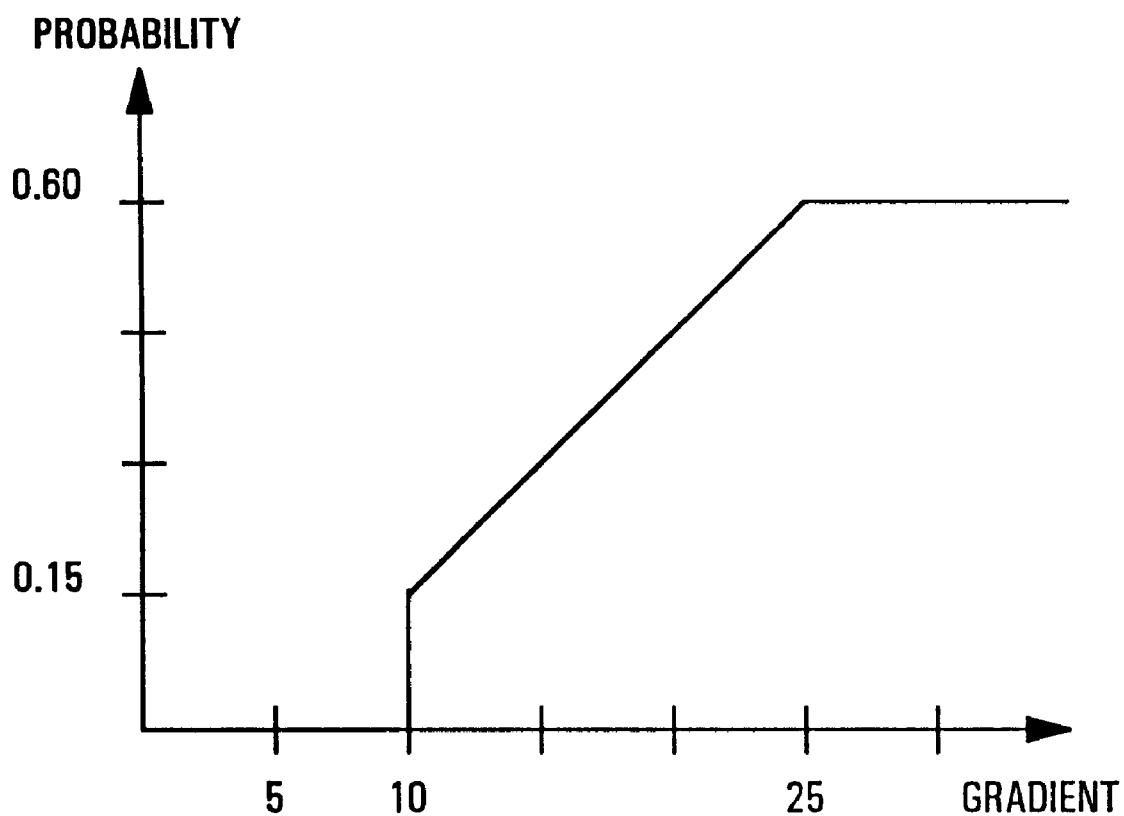
FIG. 13 is a graph illustrating the application probability of edge sharpening to a color digital halftone image before local brightness variation reduction as practiced according to one embodiment of the present invention.

In practice, the results obtained by the basic algorithm described above may be too sharp, i.e., there are disturbing bands or highlighting effects near sharp edges. The solution suggested by A. Silverstein is to perform the routine on odd location lines only. We incorporated a similar solution in which a sharpening dot switch, if needed, is done randomly with a probability proportional to the gray-level difference, for example, as described in FIG. 13. FIG. 13 is a graph illustrating the application probability of edge sharpening to a color digital halftone image before Ink Relocation as practiced according to one embodiment of the present invention.

The x axis is the magnitude of the gradient (i.e., the difference in gray value of the neighboring pixel pair), and the y axis is the probability factor that was used in the randomization. The sharpening procedure was applied randomly so that the average application ratio for pixels with a specific probability factor was equal to that factor.

The randomization produces sharp image halftones with reasonable bands. Combined with the Ink Relocation postprocess, which is active in reducing highlighted bands anyway, the sharpening produces comparable sharpened halftones with significantly less bands and highlights.

Note that the above halftone sharpening algorithm uses an image gradient (for sharpening), as does local brightness variation reduction via ink relocation (for possible suppression). One can be more comprehensive and ask what combinations of these local operations best approximate the image gradient at a given location. If one does this, one should be careful to use a good gradient estimator (i.e., an estimator with some smoothing built in) because gradient measurement can be very sensitive to high spacial frequency noise. Thus, by including the notion of gradient approximation into the algorithm, the blurring issue can be resolved.

4. Ink Relocation Process

Figure 7:
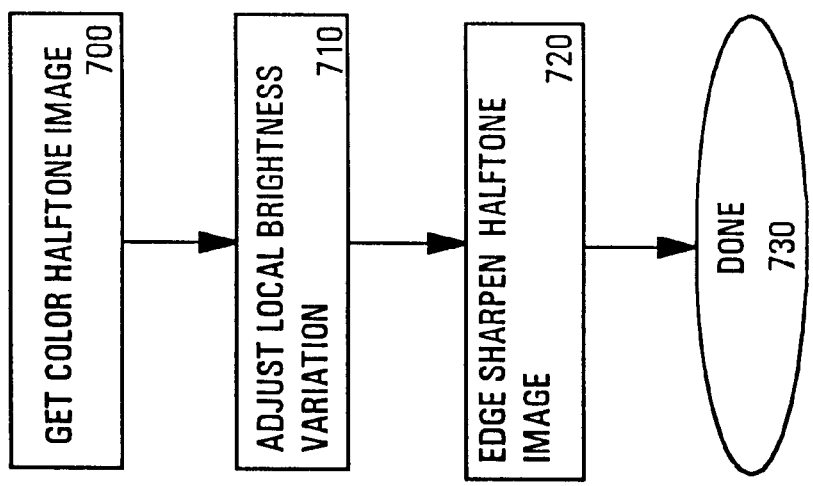
FIG. 7 is a flow chart illustrating local brightness variation reduction of a color halftone digital image as practiced according to one embodiment of the present invention.

FIG. 7 is a flow chart illustrating local brightness variation reduction of a color halftone digital image as practiced according to one embodiment of the present invention. In FIG. 7, it can be seen that the color halftone image to process is first retrieved (process 700). For one embodiment, the entire color halftone image is retrieved at once. Alternately, only a portion of the image is retrieved. It may be the case that only a portion of the image is retrieved because it is only desired to adjust the brightness variation for a portion of the halftone image. However, it may also be the case that multiple portions of the image may be adjusted with different portions of the halftone image being processed either sequentially or in parallel.

In process 710, the local brightness variation is adjusted for the halftone image (or portion thereof) retrieved in process 700. If desired, the adjusted halftone image is edge sharpened in process 720 before termination 730.

Figure 8:
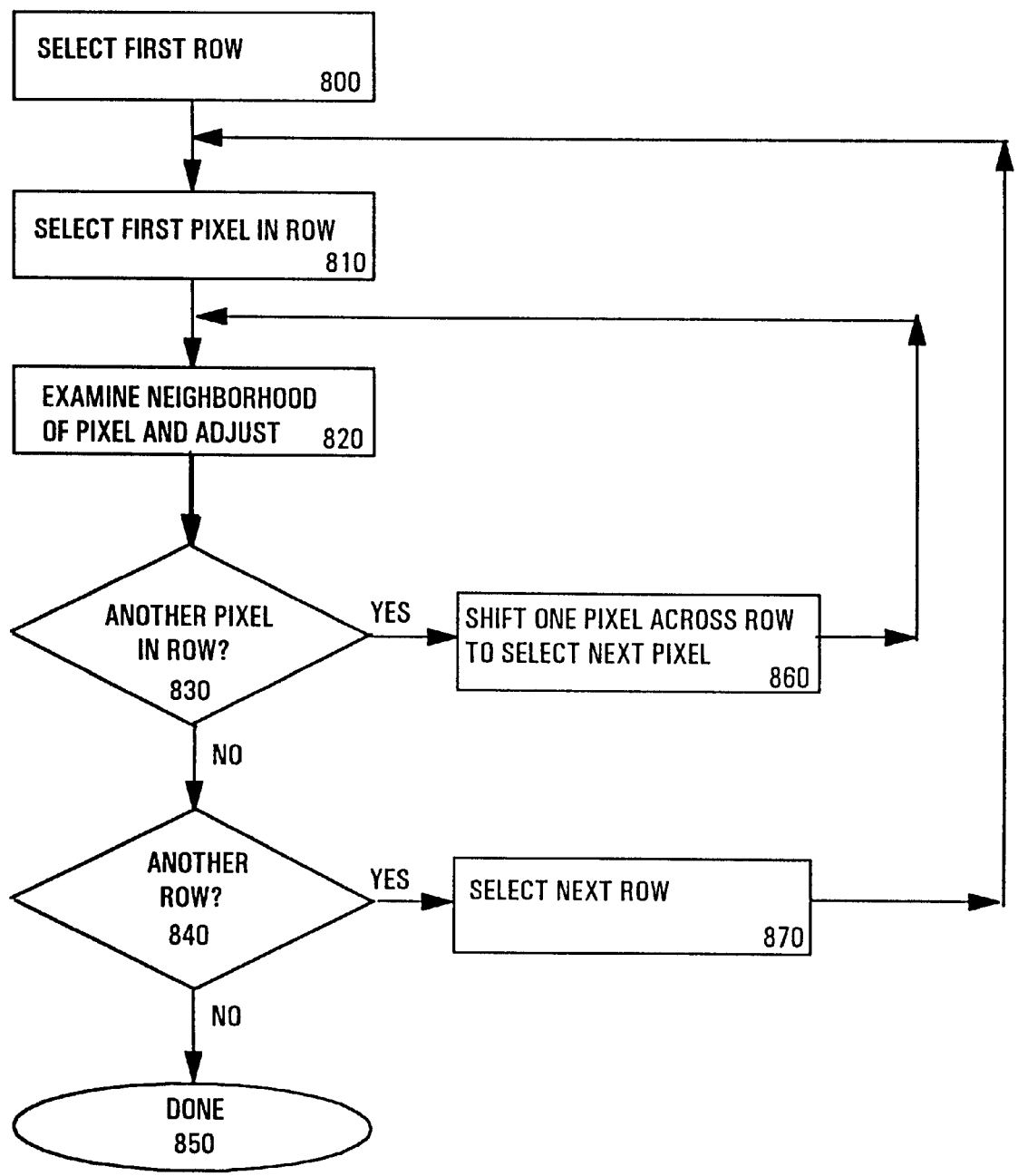
FIG. 8 is a flow chart illustrating control for adjusting local brightness variation of a color digital halftone image as practiced according to one embodiment of the present invention.

FIG. 8 is a flow chart illustrating control for adjusting local brightness variation (process 710) of a color digital halftone image as practiced according to one embodiment of the present invention. The first row of the image to be processed is selected in process 800, and the first pixel in the row is selected in process 810. In process 820, the neighborhood of the selected pixel is examined and the local minimum brightness variation is adjusted if a candidate pair of adjacent pixels is identified. That is, if the selected pixel and another pixel in the neighborhood of the selected pixel are found to have a non-minimal brightness variation, the values of these two pixels are adjusted so as to minimize the local brightness variation. As mentioned earlier, the specific neighboring pixels to be examined can be varied. Typically, examining more neighboring pixels decreases halftone noise, but increases blur, and also increases processing time.

In decision block 830, a test is performed to determine whether there is at least one more pixel in the selected row. If there is another pixel in the row, a shift by one pixel across the row is performed in process 860 to select the next pixel in the row. Processing then continues to process 820 where the neighborhood of the newly-selected pixel is examined and the local minimum brightness variation is again adjusted if a candidate pair of adjacent pixels is identified.

If there is not another pixel in the row, then a test is performed in decision block 840 to determine whether there is at least one more row in the image. If there is another row in the image, a shift by one row in the image is performed in process 870 to form the next selected row. Processing terminates at terminal 850 when all rows have been processed.

Figure 9:
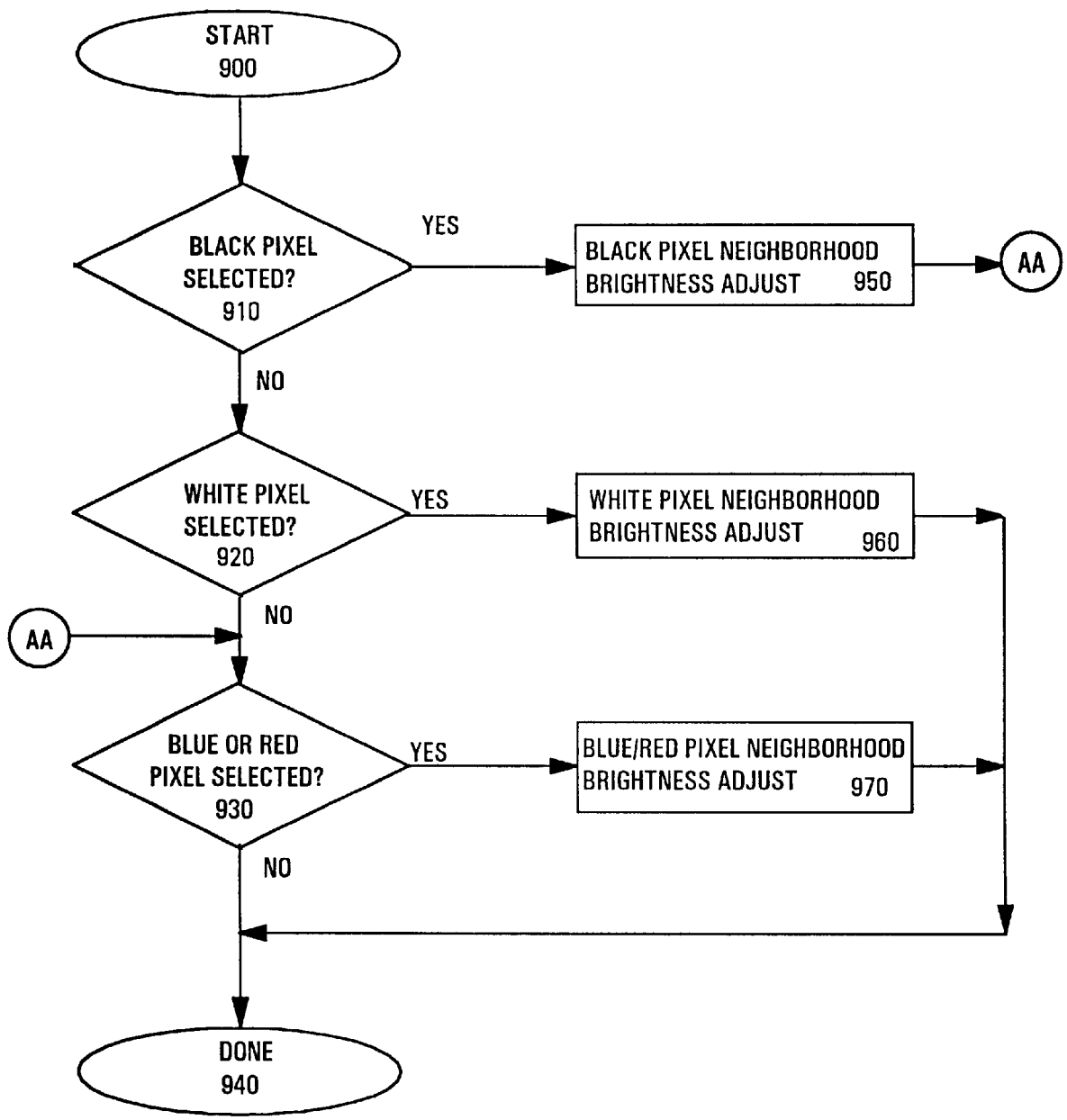
FIG. 9 is a flow chart illustrating pixel neighborhood examination and adjustment for the local brightness variation reduction of a color digital halftone image as practiced according to one embodiment of the present invention.

FIG. 9 is a flow chart illustrating pixel neighborhood examination and adjustment for the local brightness variation reduction of a color digital halftone image as practiced according to one embodiment of the present invention (process 820). The examination and adjustment begins in process 900.

In decision block 910, a test is performed to determine whether the selected pixel has a value of Black. If the selected pixel has a value of Black, then a Black pixel neighborhood adjustment is made in process 950 before proceeding to decision block 930.

If it was found in decision block 910 that the selected pixel does not have a value of Black, then a test is performed in decision block 920 to determine whether the selected pixel has a value of White. If the selected pixel has a value of White, then a White pixel neighborhood adjustment is made in process 960 before termination at terminal 940.

Similarly, if it was found in decision block 920 that the selected pixel does not have a value of White, then a test is performed in decision block 930 to determine whether the selected pixel has a value of Blue or Red. If the selected pixel has a value of Blue or Red, then a Blue/Red pixel neighborhood adjustment is made in process 970 before termination at terminal 940.

Finally, if it was found in decision block 930 that the selected pixel does not have a value of Blue or Red, then local brightness variation adjustment for the selected pixel is not necessary and processing terminates at terminal 940.

Note that a trade-off between final image quality and processing speed can be made. For example, skipping decision block 930 and process block 970 will decrease processing time, but will also permit a greater amount of local brightness variation.

Figure 10:
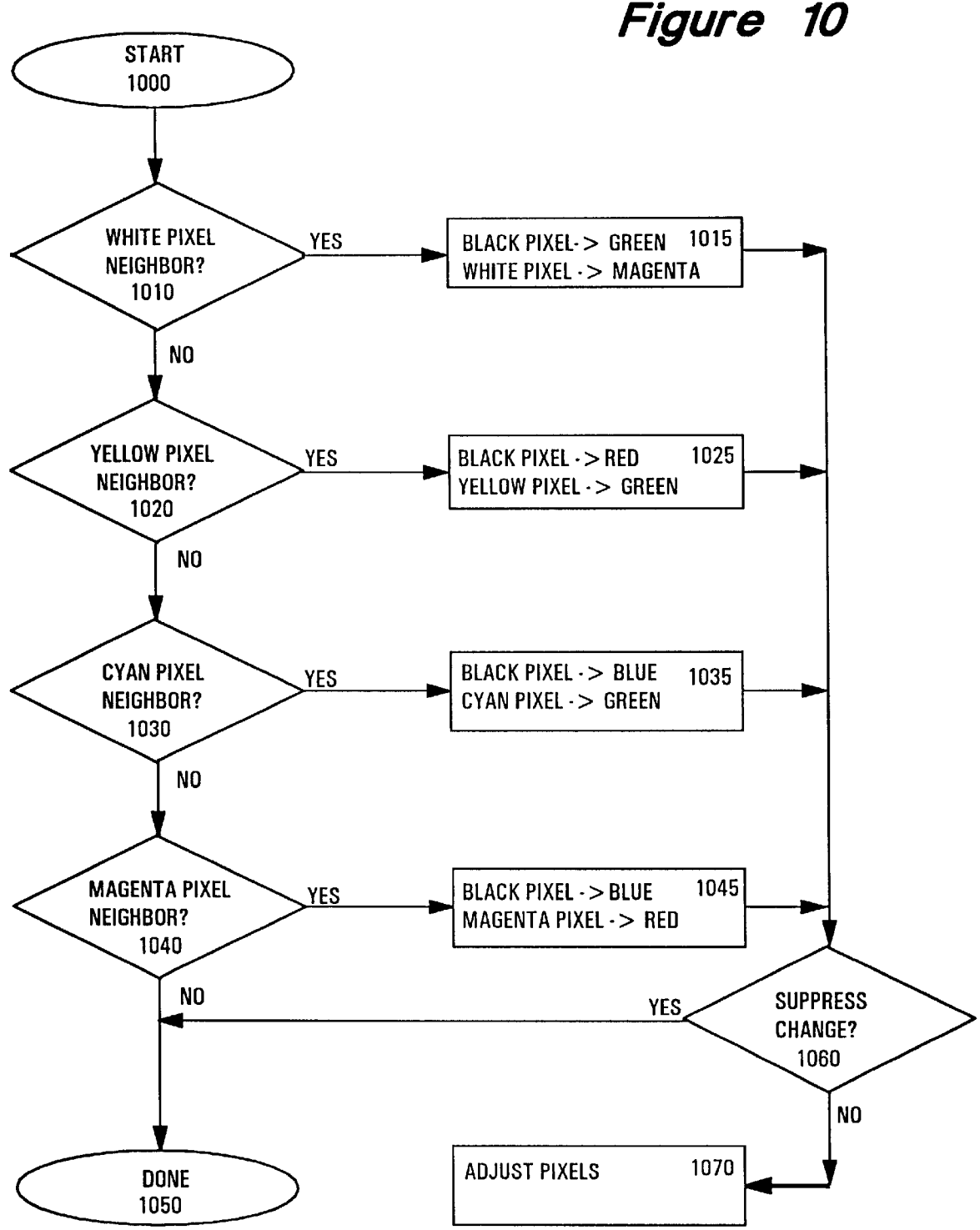
FIG. 10 is a flow chart illustrating the black pixel neighborhood local brightness variation reduction portion of a color digital halftone image as practiced according to one embodiment of the present invention.

FIG. 10 is a flow chart illustrating the black pixel neighborhood local brightness variation reduction portion of a color digital halftone image as practiced according to one embodiment of the present invention (process 950). The Black pixel neighborhood examination and adjustment begins in process 1000.

In decision block 1010, a test is performed to determine whether the selected pixel has a neighbor pixel with a value of White. If the selected pixel has a White-valued pixel neighbor, then local brightness variation can be reduced by changing the value of the selected pixel from Black to Green and changing the value of the White-valued neighbor to Magenta as shown in process 1015.

If it was found in decision block 1010 that the selected pixel does not have a White-valued pixel neighbor, then a test is performed in decision block 1020 to determine whether the selected pixel has a Yellow-valued pixel neighbor. If the selected pixel has a Yellow-valued pixel neighbor, then local brightness variation can be reduced by changing the value of the selected pixel from Black to Red and changing the value of the Yellow-valued neighbor to Green as shown in process 1025.

Similarly, if it was found in decision block 1020 that the selected pixel does not have a Yellow-valued pixel neighbor, then a test is performed in decision block 1030 to determine whether the selected pixel has a Cyan-valued pixel neighbor. If the selected pixel has a Cyan-valued pixel neighbor, then local brightness variation can be reduced by changing the value of the selected pixel from Black to Blue and changing the value of the Cyan-valued neighbor to Green as shown in process 1035.

If it was found in decision block 1030 that the selected pixel does not have a Cyan-valued pixel neighbor, then a test is performed in decision block 1040 to determine whether the selected pixel has a Magenta-valued pixel neighbor. If the selected pixel has a Magenta-valued pixel neighbor, then local brightness variation can be reduced by changing the value of the selected pixel from Black to Blue and changing the value of the Magenta-valued neighbor to Red as shown in process 1045.

Finally, if it was found in decision block 1040 that the selected pixel does not have a value of Magenta, then local brightness variation adjustment for the selected pixel is not possible for this neighborhood and processing terminates at terminal 1050.

As mentioned earlier, it may be the case that minimization of local brightness variation should be suppressed for the neighborhood being examined. Thus, if a candidate pixel pair has been identified by the tests of decision blocks 1010, 1020, 1030 or 1040, a test is performed in decision block 1060 to determine whether the pixel value adjustment is to be suppressed. If it is determined in decision block 1060 that the pixel adjustment is not to be suppressed, then the appropriate pixel value adjustment (i.e., respective process 1015, 1025, 1035 or 1045) is made in process 1070 before termination at terminal 1050.

On the other hand, if it is determined in decision block 1060 that the pixel adjustment is to be suppressed, then the appropriate pixel value adjustment (i.e., respective process 1015, 1025, 1035 or 1045) is not made and processing simply terminates at terminal 1050.

Note that alternately, rather than adjusting the minimum brightness variation pair of the neighbors, one could simply adjust the first neighbor identified that could reduce brightness variation. Although this alternate method may not produce the absolute minimum local brightness variation, it reduces processing time and yields a final image having lower local brightness variation than the unprocessed halftone image.

Figure 11:
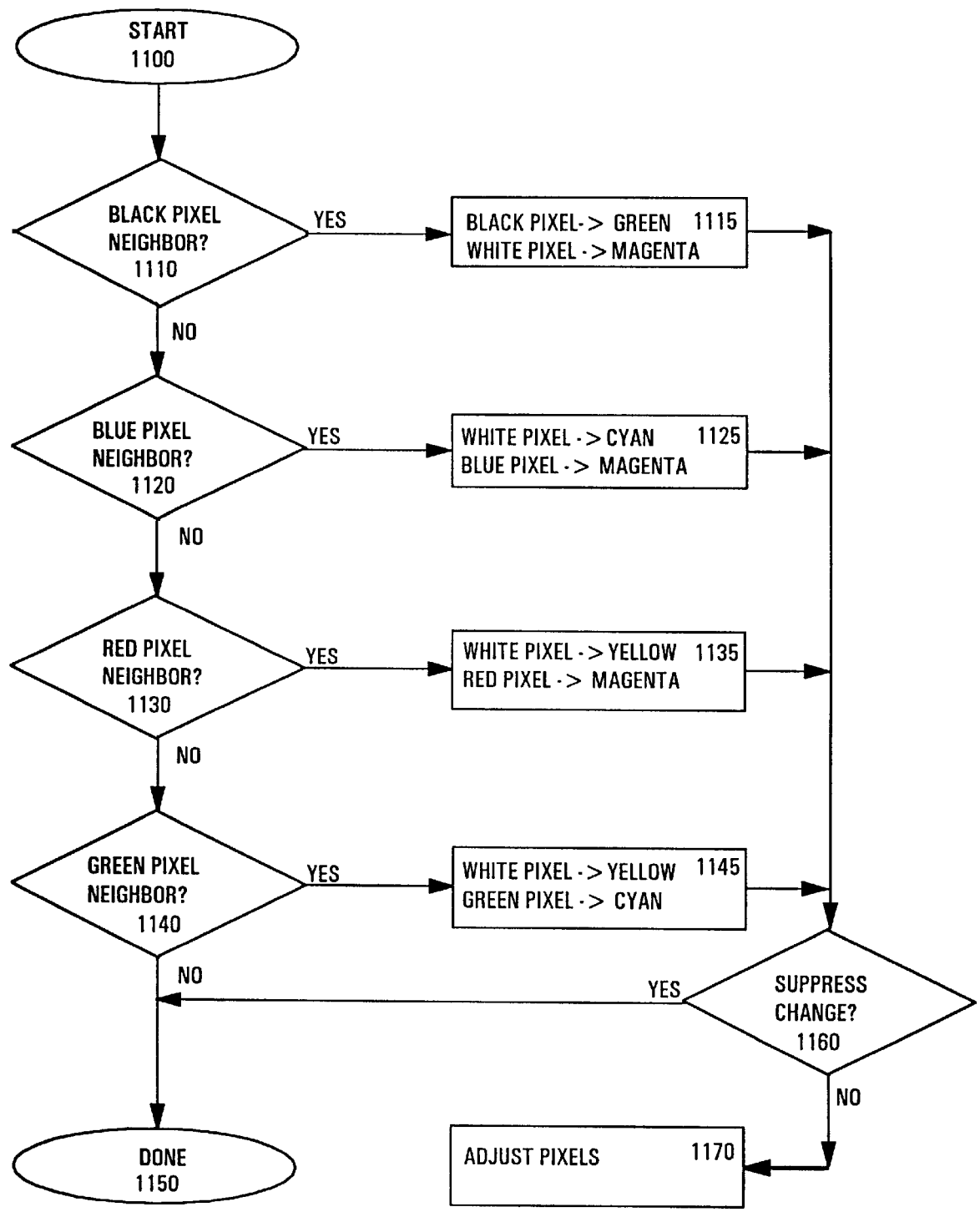
FIG. 11 is a flow chart illustrating the white pixel neighborhood local brightness variation reduction portion of a color digital halftone image as practiced according to one embodiment of the present invention.

FIG. 11 is a flow chart illustrating the white pixel neighborhood local brightness variation reduction portion of a color digital halftone image as practiced according to one embodiment of the present invention (process 960). The White pixel neighborhood examination and adjustment begins in process 1100.

In decision block 1110, a test is performed to determine whether the selected pixel has a neighbor pixel with a value of Black. If the selected pixel has a Black-valued pixel neighbor, then local brightness variation can be reduced by changing the value of the selected pixel from White to Green and changing the value of the Black-valued neighbor to Magenta as shown in process 1115.

If it was found in decision block 1110 that the selected pixel does not have a Black-valued pixel neighbor, then a test is performed in decision block 1120 to determine whether the selected pixel has a Blue-valued pixel neighbor. If the selected pixel has a Blue-valued pixel neighbor, then local brightness variation can be reduced by changing the value of the selected pixel from White to Cyan and changing the value of the Blue-valued neighbor to Magenta as shown in process 1125.

Similarly, if it was found in decision block 1120 that the selected pixel does not have a Blue-valued pixel neighbor, then a test is performed in decision block 1130 to determine whether the selected pixel has a Red-valued pixel neighbor. If the selected pixel has a Red-valued pixel neighbor, then local brightness variation can be reduced by changing the value of the selected pixel from White to Yellow and changing the value of the Red-valued neighbor to Magenta as shown in process 1135.

If it was found in decision block 1130 that the selected pixel does not have a Red-valued pixel neighbor, then a test is performed in decision block 1140 to determine whether the selected pixel has a Green-valued pixel neighbor. If the selected pixel has a Green-valued pixel neighbor, then local brightness variation can be reduced by changing the value of the selected pixel from White to Yellow and changing the value of the Green-valued neighbor to Cyan as shown in process 1145.

Finally, if it was found in decision block 1140 that the selected pixel does not have a value of Green, then local brightness variation adjustment for the selected pixel is not possible for this neighborhood and processing terminates at terminal 1150.

Again, it may be the case that minimization of local brightness variation should be suppressed for the neighborhood being examined. Thus, if a candidate pixel pair has been identified by the tests of decision blocks 1110, 1120, 1130 or 1150, a test is performed in decision block 1160 to determine whether the pixel value adjustment is to be suppressed. If it is determined in decision block 1160 that the pixel adjustment is not to be suppressed, then the appropriate pixel value adjustment (i.e., respective process 1115, 1125, 1135 or 1145) is made in process 1170 before termination at terminal 1150.

On the other hand, if it is determined in decision block 1160 that the pixel adjustment is to be suppressed, then the appropriate pixel value adjustment (i.e., respective process 1115, 1125, 1135 or 1145) is not made and processing simply terminates at terminal 1150.

Figure 12:
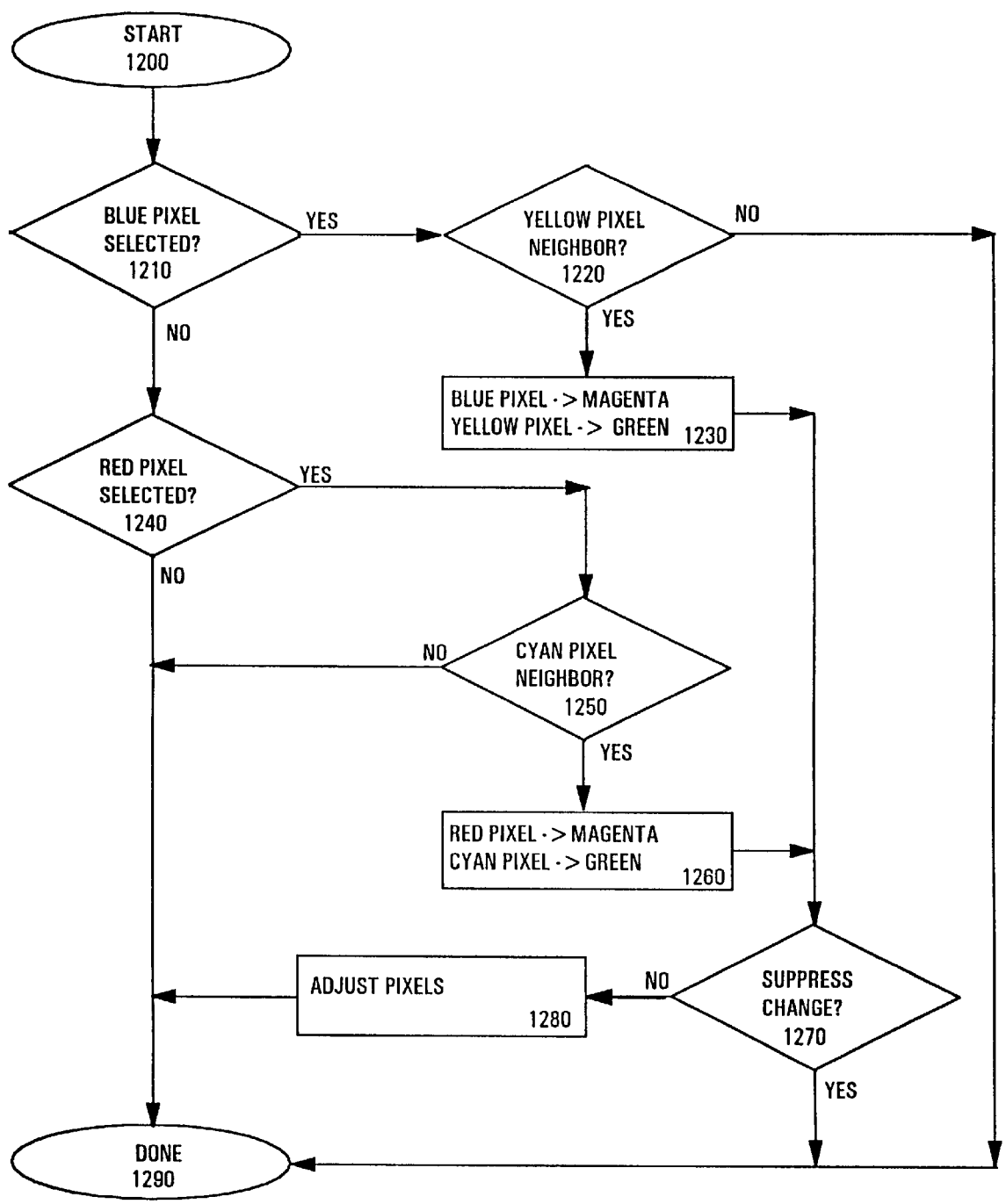
FIG. 12 is a flow chart illustrating the blue/red pixel neighborhood local brightness variation reduction portion of a color digital halftone image as practiced according to one embodiment of the present invention.

FIG. 12 is a flow chart illustrating the blue/red pixel neighborhood local brightness variation reduction portion of a color digital halftone image as practiced according to one embodiment of the present invention (process 970). The Blue/Red pixel neighborhood examination and adjustment begins in process 1200.

In decision block 1210, a test is performed to determine whether the selected pixel has a value of Blue. If the selected pixel has a Blue value, then a test is performed in decision block 1220 to determine whether the selected pixel has a neighbor pixel with a value of Yellow. If the Blue-valued selected pixel has a Yellow-valued pixel neighbor, then local brightness variation can be reduced by changing the value of the selected pixel from Blue to Magenta and changing the value of the Yellow-valued neighbor to Green as shown in process 1230.

On the other hand, if the Blue-valued selected pixel does not have a Yellow-valued pixel neighbor, then local brightness variation adjustment for the selected pixel is not possible for this neighborhood and processing terminates at terminal 1290.

Similarly, if it was found in decision block 1210 that the selected pixel does not have a Blue value, then a test is performed in decision block 1240 to determine whether the selected pixel has a value of Red. If the selected pixel has a Red value, then a test is performed in decision block 1250 to determine whether the selected pixel has a neighbor pixel with a value of Cyan. If the Red-valued selected pixel has a Cyan-valued pixel neighbor, then local brightness variation can be reduced by changing the value of the selected pixel from Red to Magenta and changing the value of the Cyan-valued neighbor to Green as shown in process 1260.

On the other hand, if the Red-valued selected pixel does not have a Cyan-valued pixel neighbor, then local brightness variation adjustment for the selected pixel is not possible for this neighborhood and processing terminates at terminal 1290.

Finally, if it was found in decision block 1240 that the selected pixel does not have a value of Red, then local brightness variation adjustment for the selected pixel is not possible for this neighborhood and processing terminates at terminal 1290.

Again, it may be the case that minimization of local brightness variation should be suppressed for the neighborhood being examined. Thus, if a candidate pixel pair has been identified by the tests of decision blocks 1210 and 1220, or by the tests of decision blocks 1240 and 1250, a test is performed in decision block 1270 to determine whether the pixel value adjustment is to be suppressed. If it is determined in decision block 1270 that the pixel adjustment is not to be suppressed, then the appropriate pixel value adjustment (i.e., respective process 1230 or 1260) is made in process 1280 before termination at terminal 1290.

On the other hand, if it is determined in decision block 1270 that the pixel adjustment is to be suppressed, then the appropriate pixel value adjustment (i.e., respective process 1230 or 1260) is not made and processing simply terminates at terminal 1290.

5. Summary

Regardless of whether edge sharpening is applied, the Ink Relocation algorithm can be applied as a post filter to any color halftoned digital image, and it can substantially improve the image quality. It is also reasonably fast to compute.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A process for a color image halftone comprising the steps of:
    examining brightness variation within a neighborhood of the color image halftone; and
    adjusting color values in the neighborhood so as to reduce local brightness variation, wherein the color values are adjusted such that a black and white neighbor pair is replaced with a green and magenta neighbor pair.

2. The process as set forth in claim 1, wherein local brightness variation reduction is suppressed in regions where there are edge locations.

3. The process as set forth in claim 2, wherein an edge location is determined by detecting a luminance component gradient that exceeds a threshold.

4. The process as set forth in claim 1, wherein halftone sharpening is applied to the image before reducing local brightness variation.

5. A process for a color image halftone comprising the steps of:
    examining brightness variation within a neighborhood of the color image halftone; and
    adjusting color values in the neighborhood so as to reduce local brightness variation, wherein the color values are adjusted such that a black and yellow neighbor pair is replaced with a red and green neighbor pair, a black and cyan neighbor pair is replaced with a blue and green neighbor pair, and a black and magenta neighbor pair is replaced with a blue and red neighbor pair.

6. The process as set forth in claim 5, wherein local brightness variation reduction is suppressed in regions where there are edge locations.

7. The process as set forth in claim 6, wherein an edge location is determined by detecting a luminance component gradient that exceeds a threshold.

8. The process as set forth in claim 5, wherein halftone sharpening is applied to the image before reducing local brightness variation.

9. A process for a color image halftone comprising the steps of:
    examining brightness variation within a neighborhood of the color image halftone; and
    adjusting color values in the neighborhood so as to reduce local brightness variation, wherein the color values are adjusted such that a white and blue neighbor pair is replaced with a cyan and magenta neighbor pair, a white and red neighbor pair is replaced with a yellow and magenta neighbor pair, and a white and green neighbor pair is replaced with a yellow and cyan neighbor pair.

10. The process as set forth in claim 9, wherein local brightness variation reduction is suppressed in regions where there are edge locations.

11. The process as set forth in claim 10, wherein an edge location is determined by detecting a luminance component gradient that exceeds a threshold.

12. The process as set forth in claim 9, wherein halftone sharpening is applied to the image before reducing local brightness variation.

13. A process for a color image halftone comprising the steps of:
    examining brightness variation within a neighborhood of the color image halftone; and
    adjusting color values in the neighborhood so as to reduce local brightness variation, wherein the color values are adjusted such that a blue and yellow neighbor pair is replaced with a magenta and green neighbor pair, and a red and cyan neighbor pair is replaced with a magenta and green neighbor pair.

14. The process as set forth in claim 13, wherein local brightness variation reduction is suppressed in regions where there are edge locations.

15. The process as set forth in claim 14, wherein an edge location is determined by detecting a luminance component gradient that exceeds a threshold.

16. The process as set forth in claim 13, wherein halftone sharpening is applied to the image before reducing local brightness variation.

17. A processor for a color image halftone comprising:
    a comparer to examine brightness variation within a neighborhood of the color image halftone; and
    a relocator to adjust color values in the neighborhood so as to reduce local brightness variation, wherein the color values are adjusted such that a black and white neighbor pair is replaced with a green and magenta neighbor pair.

18. The processor as set forth in claim 17, comprising a suppressor to suppress local brightness variation reduction in regions where there are edge locations.

19. The processor as set forth in claim 18, wherein an edge location is determined by detecting a luminance component gradient that exceeds a threshold.

20. The processor as set forth in claim 17, wherein halftone sharpening is applied to the image before reducing local brightness variation.

21. A processor for a color image halftone comprising:
    a comparer to examine brightness variation within a neighborhood of the color image halftone; and
    a relocator to adjust color values in the neighborhood so as to reduce local brightness variation, wherein the color values are adjusted such that a black and yellow neighbor pair is replaced with a red and green neighbor pair, a black and cyan neighbor pair is replaced with a blue and green neighbor pair, and a black and magenta neighbor pair is replaced with a blue and red neighbor pair.

22. The processor as set forth in claim 21, comprising a suppressor to suppress local brightness variation reduction in regions where there are edge locations.

23. The processor as set forth in claim 22, wherein an edge location is determined by detecting a luminance component gradient that exceeds a threshold.

24. The processor as set forth in claim 21, wherein halftone sharpening is applied to the image before reducing local brightness variation.

25. A processor for a color image halftone comprising:
    a comparer to examine brightness variation within a neighborhood of the color image halftone; and
    a relocator to adjust color values in the neighborhood so as to reduce local brightness variation, wherein the color values are adjusted such that a white and blue neighbor pair is replaced with a cyan and magenta neighbor pair, a white and red neighbor pair is replaced with a yellow and magenta neighbor pair, and a white and green neighbor pair is replaced with a yellow and cyan neighbor pair.

26. The processor as set forth in claim 25, comprising a suppressor to suppress local brightness variation reduction in regions where there are edge locations.

27. The processor as set forth in claim 26, wherein an edge location is determined by detecting a luminance component gradient that exceeds a threshold.

28. The processor as set forth in claim 25, wherein halftone sharpening is applied to the image before reducing local brightness variation.

29. A processor for a color image halftone comprising:

a comparer to examine brightness variation within a neighborhood of the color image halftone; and a relocator to adjust color values in the neighborhood so as to reduce local brightness variation, wherein the color values are adjusted such that a blue and yellow neighbor pair is replaced with a magenta and green neighbor pair, and a red and cyan neighbor pair is replaced with a magenta and green neighbor pair.

30. The processor as set forth in claim 29, comprising a suppressor to suppress local brightness variation reduction in regions where there are edge locations.

31. The processor as set forth in claim 30, wherein an edge location is determined by detecting a luminance component gradient that exceeds a threshold.

32. The processor as set forth in claim 29, wherein halftone sharpening is applied to the image before reducing local brightness variation.

* * * * *